United States Patent [19]

Terkanian

[11] 4,409,647

[45] Oct. 11, 1983

[54] POWER CONVERTER USING A RESONANT CIRCUIT

[76] Inventor: Harry Terkanian, 267 Concord Ave., Lexington, Mass. 02173

[21] Appl. No.: 243,125

[22] Filed: Mar. 12, 1981

[51] Int. Cl.³ ...................... H02M 3/315; H02M 5/45
[52] U.S. Cl. ........................................ 363/27; 363/37; 363/57; 363/135
[58] Field of Search ..................... 323/222; 363/16, 27, 363/28, 57, 96, 135, 37

[56] References Cited

U.S. PATENT DOCUMENTS 3,567,996  3/1971  Gordon .................................. 363/28
4,184,197  1/1980  Cuk et al. .............................. 363/16

OTHER PUBLICATIONS

IBM Technical Disclosure Bulletin, vol. 14, No. 8, pp. 2372, 73, Jan. 1972.
IBM Technical Disclosure Bulletin, vol. 20, No. 7, pp. 2601-2602, Dec. 1977.

Primary Examiner—William H. Beha, Jr.

[57] ABSTRACT

A power converter which converts alternating current (AC) utility power or direct current (DC) power to any DC output voltage by use of at least one switch and a resonant circuit resulting in power conversion by means of sinusoidal waveshapes. The resonant circuit defines the frequency of operation of the commutation circuit such that the frequency changes only a moderate amount with loads ranging anywhere from an open circuit to a short circuit, thereby providing reliable commutation and circuit operation under all load conditions.

8 Claims, 9 Drawing Figures

POWER CONVERTER USING A RESONANT CIRCUIT

BACKGROUND OF THE INVENTION

The apparatus of the present invention generally relates to power supplies and more particularly to power converters for providing direct current (DC) power.

In present day electronic equipment, the primary energy source is usually that received from a public utility. The voltage provided must be converted to DC at different output voltage levels. The converter must operate with wide variations in load current drawn. It must work into an open circuit. It must also withstand a short circuit at its output terminals with no destruction of its parts or other malfunction. Recovery to normal operation must be automatic upon removal of the fault.

Of all the semiconductor switch elements available today, the silicon controlled rectifier (SCR) has higher voltage and current capabilities. It requires a relatively simple and power efficient gate drive circuit to put it in conduction.

However, detracting from the superior attributes of the SCR is the fact that once turned on, it cannot be turned off by gate action. It must be turned off by causing its anode current to fall below the holding level. This must be done so the SCR can recover its forward blocking ability. Hence, lack of gate turn off control is a major problem in any converter design utilizing SCRs. This has resulted in the paralleling of bipolar transistors for power conversion applications at the kilowatt level.

Turn-off control can be achieved by using resonant circuits in which natural circuit oscillations commutate or turn off the SCR in each cycle. The two basic types of resonant converters are the parallel resonant circuit and the series resonant circuit. The SCR parallel resonant converter has the load in parallel with the capacitor (C) or inductor (L) of the LC resonant circuit. It has decent open circuit operation characteristics, but a short circuit at the output terminals is reflected back to the reactive element across which it is connected and prevents continued oscillation. Even an overload which is less than a dead short circuit can suddenly extrac t so much energy from the energy circulating in the resonant circuit that there is not enough left to complete the cycle of oscillation and commutate the SCR before additional energy can flow in from the source. The SCR latches on and oscillation stops.

The SCR series resonant converter has the load in series with the LC resonant circuit. It has excellent short circuit characteristics but when the load is open circuited, the output voltage either goes very high or the circuit stops oscillating completely, depending on the magnitude of the circuit losses which act as a partial load. Not only does the output voltage go high with a reduction in load drawn from the converter, but the resonant frequency changes drastically. For the series circuit, resonant frequency (F) is:

$$F = \sqrt{\frac{1}{LC} - \frac{R^2}{4L^2}}$$

where R is load resistance, L is inductance, and C is capacitance. Dewen and Shively in a paper entitled "An Output Clamped Series Inverter" delivered at the IEEE Power Equipment Specialists Conference in 1979, show calculations proving that with only a modest two to one change in the value of load resistance, resonant frequency also changes by approximately a two to one factor. Any abrupt load change that lowers the resonant frequency and thus upsets the critical timing relationship between the oscillation and the SCR gate pulse train causes the SCR to latch on, thus preventing continued oscillation.

The shortcomings of the SCR resonant converter have been the subject of circuit developments by various researchers which are described hereafter as best understood.

In U.S. Pat. No. 4,024,453 (Corry), the short circuit problem in a parallel resonant converter is solved by introducing an added inductor in the resonant circuit to raise the frequency of operation so that the circuit will continue to commutate. Obviously, normal frequency of operation is below the capability of the SCR. This is a shortcoming since the SCR must operate at the highest frequency it is capable of in order to compete with transistors in small size applications.

In U.S. Pat. No. 4,042,871 (Grubbs et al), the problem of impending commutation failure due to an overcurrent situation condition is overcome through the use of added circuitry to monitor input current and take preventive action. The current sensing resistors cause a reduction in overall power conversion efficiency. Here also, a race against time must be won.

In U.S. Pat. No. 4,069,449 (Farnsworth), complex circuitry is added to solve the overload problem. Again, speed is of the essence.

In U.S. Pat. No. 4,156,274 (Fukui et al), the open circuit problem in a series resonant converter is overcome by use of an added transformer winding and an SCR to clamp the output voltage to the DC input line. Again, increased parts count and circuit complexity result.

In U.S. Pat. No. 4,200,830 (Oughton et al), the overcurrent problem in a series resonant converter is solved by means of a fault current sensor and feedback arrangement. The result is a relatively complex circuit and increased parts count.

Referring again to the previously referenced article by Dewan and Shively, a series resonant converter is described. The open circuit problem is dealt with by means of an added tertiary winding on the output transformer which is clamped to the DC input voltage bus by means of a rectifier bridge. If the DC input is unregulated, the clamp level will fluctuate reducing the effectiveness of this method. Again, this solution suffers from added circuit complexity and added components.

In General Electric Co. Application Note 200.49 Feb. 1961, entitled "A Low Cost Ultrasonic Frequency Inverter Using A Single SCR", N. Mapham, a parallel resonant inverter is described. A separate inductor and capacitor are added to the circuit solely to limit current to a safe value during an overload. The capacitor has 66 times the capacitance used in the resonant circuit and the inductor has 100 times the inductance of the inductor used in the resonant circuit. The addition of these two large reactive elements is not a good solution to the short circuit problem if size, weight, and cost are design requirements.

It is accordingly a primary object of the present invention to provide an improved power converter for generating a DC output.

SUMMARY OF THE INVENTION

The above and other objects of the invention overcome the foregoing and other disadvantages of the prior art by providing a novel power converter which includes a relatively small number of components and which can sustain wide variations in output loading. The present invention accepts as a primary power source, either an AC or a DC input. After smoothing by a capacitor, power flows through a charging inductor to charge, in one embodiment, a T-shaped capacitor network. This network serves as the capacitor of a series resonant LC network. In operation, a semiconductor switch is turned on, charge stored on the capacitors causes a sinusoid-like current to flow through a commutating inductor and the switch until the charge on the capacitors is reversed. Then the current reverses direction passing first through a diode connected across the switch, but poled opposite to it, and next through the commutating inductor until the capacitors in the coupling network are charged again to their original polarities. During both halves of this single oscillatory period, some of the current passes through a power transformer. The transformer output voltage is rectified, filtered and appears at the output terminals as a DC voltage. The first described charging operation reinforces the charge on the capacitors to replenish the power delivered to the load or dissipated in the circuit elements. The cycle is then repeated.

BRIEF DESCRIPTION OF THE DRAWINGS

The present invention may be better understood and its numerous objects and advantages will become apparent to those skilled in the art by reference to the accompanying drawings wherein like reference number numerals refer to like elements in the various figures in which.

DETAILED DESCRIPTION OF THE PREFERRED EMBODIMENT(S)

Figure 1:
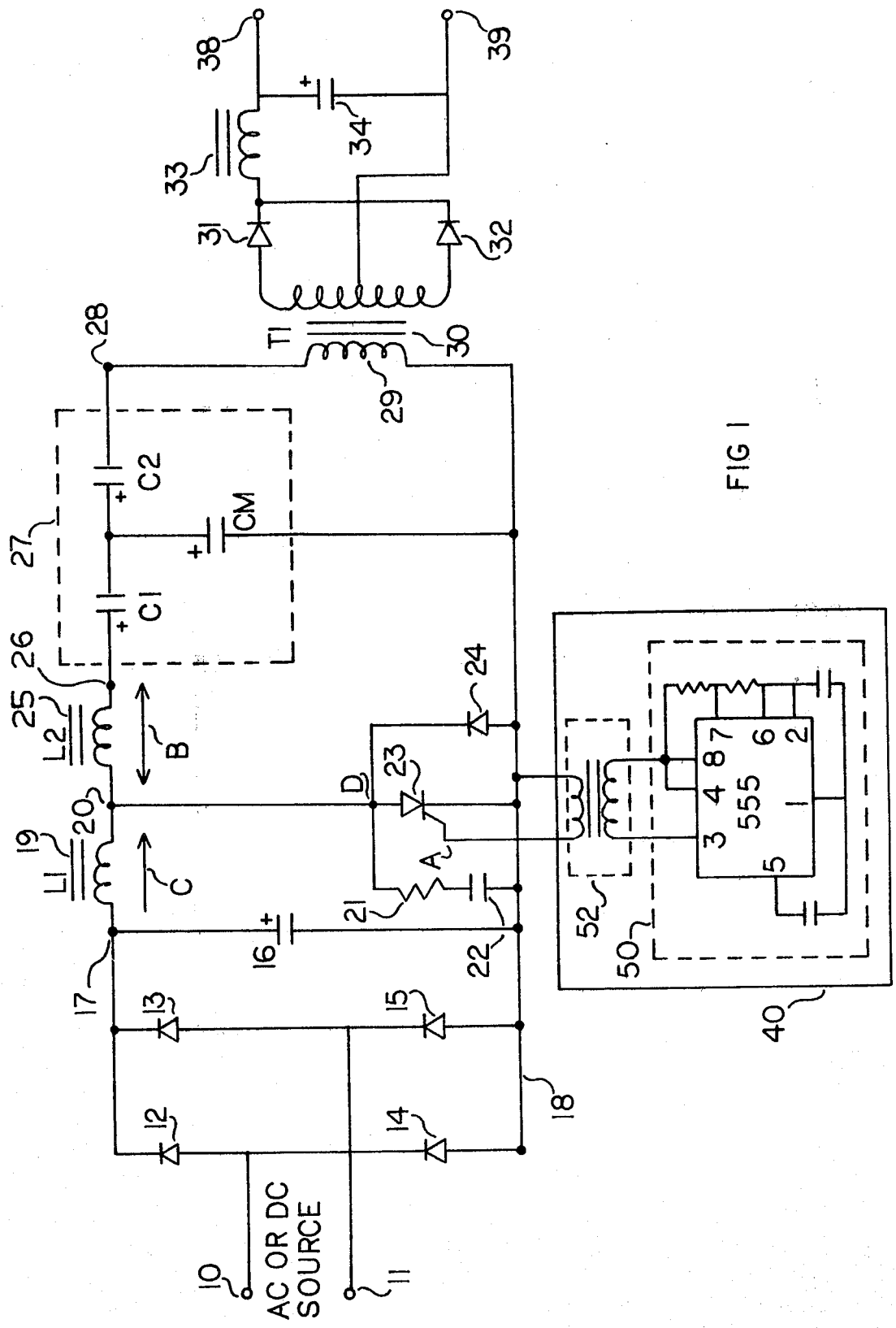
FIG. 1 is a schematic diagram of a power converter which is the preferred embodiment of the present invention.

FIG. 1 is a schematic diagram of the converter of the invention. An AC power source may be connected to terminals 10 and 11. Alternatively, a DC power source may be connected to these same terminals with the positive lead connected to terminal 10 and the negative lead connected to terminal 11. If the input power source is AC, then it is full wave rectified in the bridge rectifier having diodes 12, 13, 14, and 15. The ripple is smoothed by capacitor 16. Hence, the DC voltage across capacitor 16 is the source voltage for the converter that follows and is coupled to the converter by terminal 17 which is the positive terminal and by terminal 18 which is the negative terminal. A charging inductor (L1) 19 couples the input power from terminal 17 to terminal 20, a point on the resonant circuit which is composed of commutating inductor (L2) 25 and network 27, which in the preferred embodiment is a T-shaped capacitor network. Switch 23 which may be a silicon controlled rectifier (SCR), a bipolar transistor, a field effect transistor (FET), or a gate turn-off SCR, is coupled in parallel with diode 24 poled in the opposite direction. A snubber network which includes a resistor 21 and capacitor 22 is connected between terminals 18 and 20. The primary 29 of power transformer (T1) 30 is connected with one end to the capacitor network 27 at terminal 28 and the other end at switch 23 at terminal 18. Transformer (T1) 30 passes power through a full wave, center tapped rectifier which includes diodes 31 and 32, through a ripple reducing filter comprising inductor 33, and capacitor 34 to output terminals 38 and 39. The gate pulse generator 40 includes an astable multivibrator 50 (for example, Signetics Corp. Model No. 555 Time Logic) connected with an external resistor capacitor network, as shown, to produce a gate pulse train of proper pulse width and repetition frequency. The pulses are coupled to switch 23 through transformer 52.

Figure 2A:
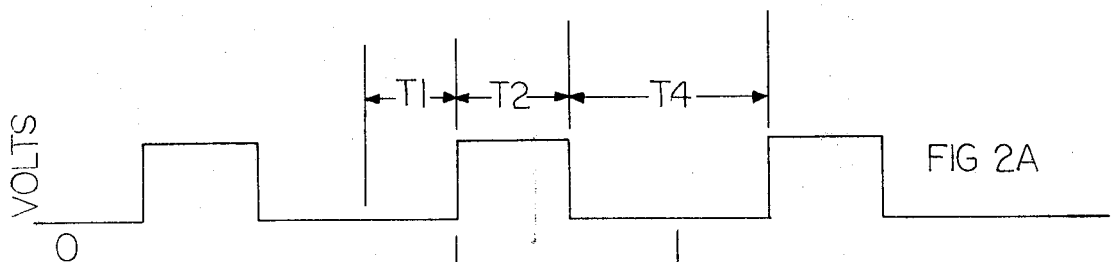
FIGS. 2A through 2D are timing diagrams containing representative waveforms and illustrate the operation of certain elements of the present invention.
Figure 2B:
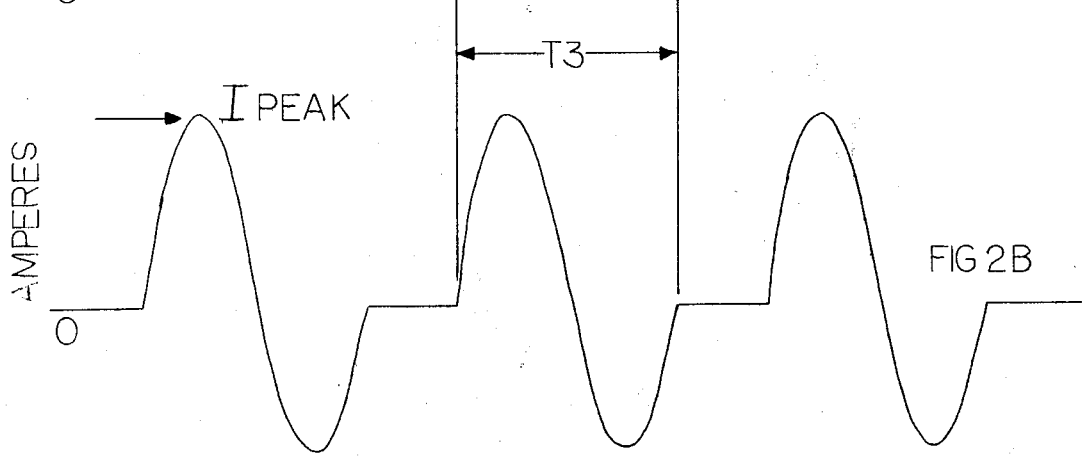

Referring to the waveforms of FIG. 2 as well as the diagram of FIG. 1, the operation of the converter of the present invention will be explained in detail. Assume that the converter is in operation and is in the time interval marked T1 in FIG. 2A. All three capacitors C1, C2, and Cm of network 27 are charged with the polarity as shown in FIG. 1. Then, at the end of time T1, an SCR gate pulse of width T2 is applied to the gate A of switch 23 and causes it to conduct. The charge stored in network 27 causes a sinusoid like current, as shown in FIG. 2B, to flow through commutating inductor (L2) 25, then switch 23, and then transformer primary 29, until the three capacitors in network 27 are charged with a polarity the opposite of that shown in FIG. 1. Immediately, this sinusoid like current reverses direction passing through transformer primary 29, then diode 24, and then commutating inductor (L2) 25 and deposits a charge on network 27. This sinusoid like current flows in the circuit as indicated by bidirectional arrow B of FIG. 1.

The current stops at the end of the T3 interval and the charge left on the three capacitors is once again of the polarity shown in FIG. 1. However, the magnitude of the charge at the end of interval T3 is lower than at the start of interval T3 because some power has passed through transformer (T1) 30 to the output load and some has been dissipated as losses in the circuit elements. During the T3 time interval, the entire DC input voltage between terminals 17 and 18 was impressed across charging inductor (L1) 19 and energy was stored in its magnetic field.

Figure 2C:
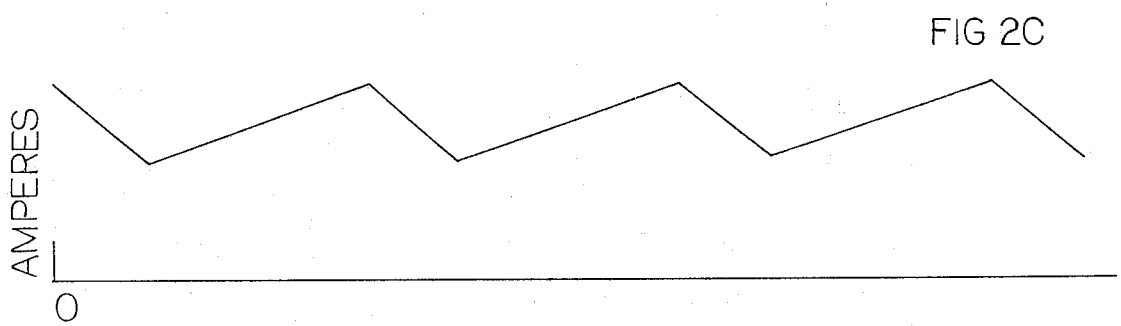
Figure 2D:
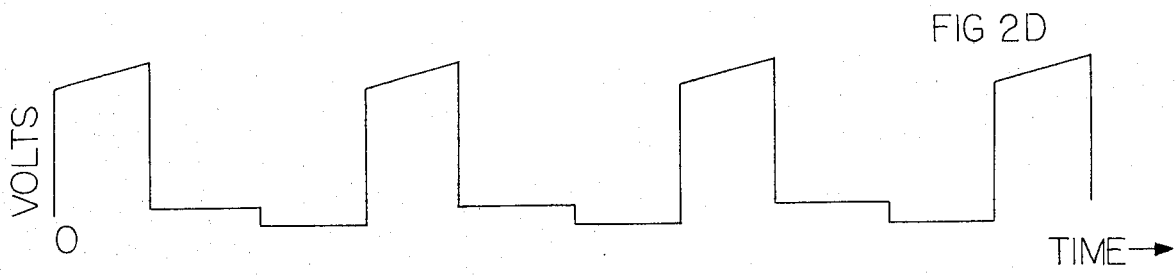

A unidirectional current flowing in charging inductor (L1) 19, and indicated by arrow C in FIG. 1 is illustrated in FIG. 2C. When the current stops flowing at the end of time interval T3, diode 24 resumes its blocking mode. The polarity of charging inductor 19 reverses and the energy stored therein is delivered to the capacitors of network 27, thus increasing the magnitude of the charge stored therein. The waveshape at node D of FIG. 1 is shown in FIG. 2D. The cycle is then repeated. A snubber network which consists of resistor 21, and capacitor 22 suppresses any oscillation that would occur due to the turn-off characteristics of diode 24. The sinusoid like current described above is called circulating current because only part of it passes out through transformer (T1) 30 to the load during each cycle.

For proper and dependable commutation, neither the frequency nor the amplitude of the circulating current (FIG. 2B) should deviate greatly from normal values under all line and load conditions. Should a decrease in the frequency of oscillation occur so fast that the SCR gate pulse generator 40 due to a time lag produced a pulse at an inappropriate time, the SCR will latch on and circuit operation will come to an end. For example, if an SCR gate pulse were to occur at the start of the T1 interval of FIG. 2A, the volt-second product impressed upon charging inductor (L1) 19, would increase to the point of exceeding its design rating and saturation would result. The SCR would latch on, commutation would stop and circuit operation would come to an end.

In the present invention, the T-shaped capacitor network 27 has an equivalent capacitance Cx which with commutating inductor (L2) 25, forms the resonant circuit. It also determines the frequency and amplitude of the circulating current (FIG. 2B). The network 27 also acts to buffer the resonant circuit from being affected by major load changes and permits it to commutate reliably for all values of laod from no load to a short circuit. The following calculations will show that the frequency and peak amplitude of the circulating current of the convertor of the present invention will not undergo any drastic changes with major load changes.

Referring to FIG. 2B, $$\frac{1}{F} = T3 = 2\pi \sqrt{(L2)(Cx)}$$

where F is frequency of oscillation and Cx is equivalent capacitance looking into terminals 18 and 26 of network 27 of FIG. 1. Also, $$Ipeak = \frac{E}{\sqrt{\frac{L2}{Cx}}}$$

where Ipeak is as shown in FIG. 2B and E is the DC input voltage as measured between terminals 17 and 18, of FIG. 1. Because of the presence of the load and circuit losses, the above equations are approximations. More rigorous equations would be cumbersome and would add nothing to the discussion to follow.

First, consider the short circuit case. Assuming transformer 30, diodes 31 and 32, and inductor 33 to be lossless, a short circuit at the output terminals 38 and 39 would be reflected back to the primary 29 of transformer 30. Now let Cxsc represent the equivalent capacitance of network 27 looking into terminals 18 and 26 with a short circuited load.

Then, $$\frac{1}{Cxsc} = \frac{1}{C1} + \frac{1}{C2 + CM}$$

Now let C1=C2=CM. Not only will this simplify the calculations but this set of capacitor values is a practical set of parameters for network 27. Now, $$\frac{1}{Cxsc} = \frac{1}{C1} + \frac{1}{2C1} = \frac{3}{2C1}$$

$$Cxsc = \tfrac{2}{3}C1$$

Next, assume an open circuit. Again, with perfect lossless elements, the primary 29 of transformer 30 and capacitor C2 of network 27 is in effect removed from the circuit. Now, let Cxoc represent the equivalent capacitance of network 27 with an open circuited load. Now, $$\frac{1}{Cxoc} = \frac{1}{C1} + \frac{1}{CM} = \frac{C1 + CM}{(C1)(CM)} = \frac{2C1}{(C1)^2} = \frac{2}{C1}$$

$$Cxoc = \tfrac{1}{2}C1$$

Now recalling that $$\frac{1}{F} = T3 = 2\pi \sqrt{(L2)(Cx)}$$

We see that resonant frequency F varies inversely with the square root of the value of the capacitors. Therefore, the ratio of the resonant frequencies between the two extremes of load conditions is:

$$\sqrt{\frac{Cxsc}{Cxoc}} = \sqrt{\frac{\tfrac{2}{3}C1}{\tfrac{1}{2}C1}} = \sqrt{\frac{4}{3}} = 1.15$$

Likewise, recalling that Ipeak of the circulating current (FIG. 2B) also varies with the square root of Cx, we can see that the total change in the amplitude of the circulating current between the two extremes of load conditions is also only 15%. Since this current holds fairly constant, the reactive voltage across each element of the resonant circuit will remain fairly constant. This is advantageous since components with high voltage ratings will not be required.

Hence, the 15% total change in the resonant frequency and peak value of the circulating current is a moderate and predictable deviation from a design norm which is not severe enough to cause any failure to commutate. It is reasonable to assume that any value of load impedance between the above discussed extreme cases will stay within the 15% limit calculated above. This is because the load acts as a damping factor extracting energy from the resonant circuit during each cycle via transformer 30. The resonant circuit is dominated almost entirely by the inductance (L2) 25, and the capacitance Cx of network 27. Any deviation from this resonant frequency due to circuit damping is of a very minor magnitude.

Figure 3A:
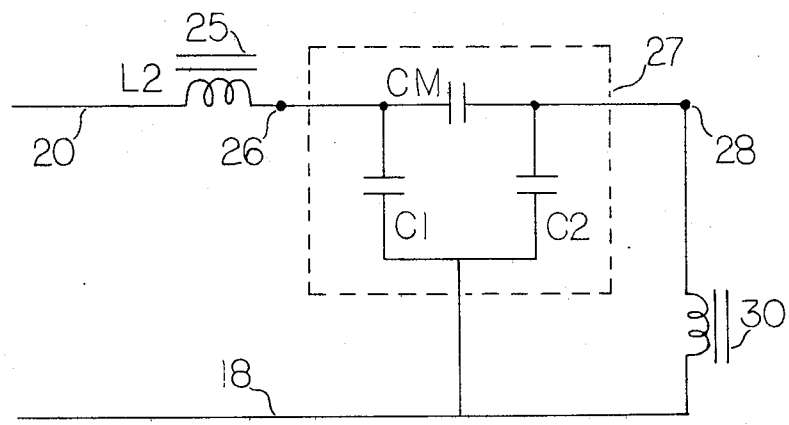
FIGS. 3A through 3D illustrate other embodiments of the present invention.
Figure 3B:
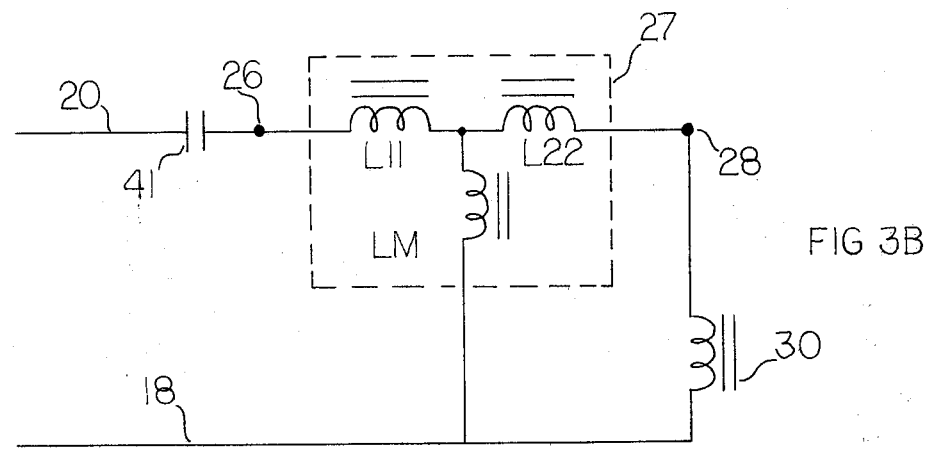
Figure 3C:
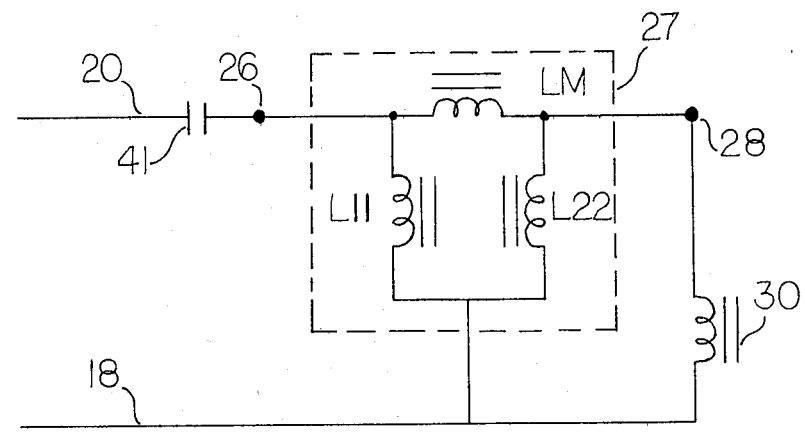
Figure 3D:
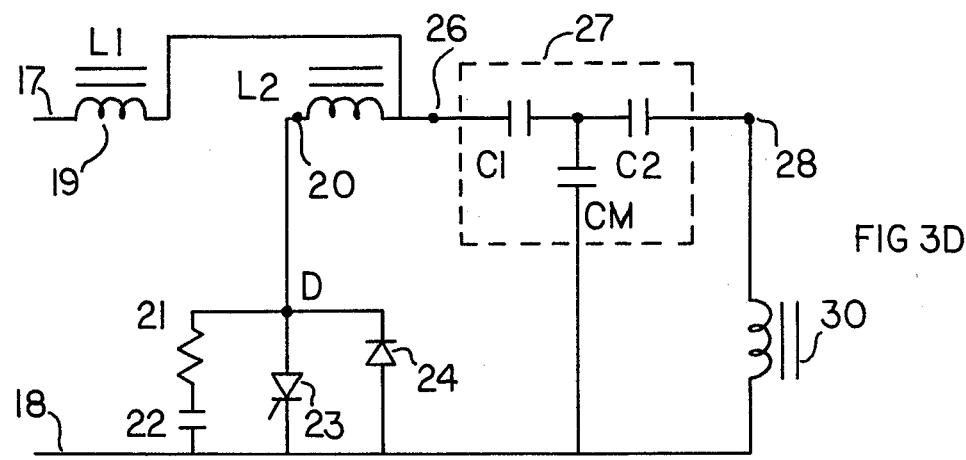

This invention is not limited to the particular details or design described in the preferred embodiment as many will suggest themselves to those skilled in the art. For example, capacitors C1, C2, and CM of netork 27 may have different values and need not be of equal value as shown in the example above. Network 17, discussed extensively herein, can be replaced with an equivalent PI shaped network as shown in FIG. 3A. Identical results will be obtained. In addition, the resonant circuit of FIG. 3B can be used in place of that in the preferred embodiment and identical results can be obtained. Likewise, the resonant circuit of FIG. 3C can be used in place of that of the preferred embodiment yielding identical results. In FIG. 3D, input power entering the resonant circuit via charging inductor (L1) 19 can enter at node 26 instead of node 20 of the preferred embodiment. Results are identical to that of the preferred embodiment. Furthermore, switch 23 is not limited to being a silicon controlled rectifier. It can also be a bipolar transistor, a field effect transistor, or a gate turn-off silicon controlled rectifier. Also, frequency of oscillation need not be bounded by the frequency limitations of present day semiconductor switches. The principles demonstrated in this invention will perform at all frequencies up to and including the megacycle range when suitable solid state switches and diodes become available. In addition, the resonant circuit described herein need not be confined to converter circuits employing a single switch inasmuch as it will work equally well with two (2) switch half-bridge circuits and four (4) switch full-bridge circuits. Further, to provide a regulated output, the pulse repetition frequency received at the gate of the SCR may be varied as required, by means of a feedback circuit from the output.

Having described the invention and for which it is desired to secure Letters Patent is:

1. A circuit for providing a direct current voltage, said circuit comprising;
   A. circuit for rectifying input A C utility voltage to obtain a direct current voltage, and
   B. means for capacitive smoothing said direct current voltage, and
   C. charging inductance means for coupling said direct current voltage to a resonant circuit
   D. said resonant circuit including three capacitive elements, each of said elements connected at a common junction in a so called T connection and having a resonant frequency that will remain in a predetermined and narrow range despite wide variations in loading
   E. switch means, consisting of an SCR, an antiparallel diode, and enabling pulse generator, said switch coupled with said charging inductor means and said resonant circuit means for enabling a circulating current representing energy received by means of said charging inductor means, and
   F. means, coupled with said resonant circuit means for converting said circulating current to said direct current voltage consisting of an output transformer, rectifier, and filter.

2. A circuit as in claim 1 wherein said input voltage is a direct current voltage.

3. A circuit for providing a direct current voltage, said circuit comprising;
   A. A circuit for rectifying input A C utility voltage to obtain a direct current voltage, and
   B. means for capacitive smoothing said direct current voltage, and
   C. charging inductance means for coupling said direct current voltage to a resonant circuit
   D. said resonant circuit including three capacitive elements, two of said capacitive elements coupled together at one end and at their other end to opposite ends of a third one of said capacitive elements, in a so called PI connection and having a resonant frequency that will remain in a predetermined and narrow range despite wide variations in loading
   E. switch means, consisting of an SCR, an antiparallel diode, and enabling pulse generator, said switch coupled with said charging inductor means and said resonant circuit means for enabling a circulating current representing energy received by means of said charging inductor means, and
   F. means, coupled with said resonant circuit means for converting said circulating current to said direct current voltage consisting of an output transformer, rectifier, and filter.

4. A circuit as in claim 3 wherein said input voltage is a direct current voltage.

5. A circuit for providing a direct current voltage, said circuit comprising;
   A. circuit for rectifying input A C utility voltage to obtain a direct current voltage, and
   B. means for capacitive smoothing said direct current voltage, and
   C. charging inductance means for coupling said direct current voltage to a resonant circuit
   D. said resonant circuit including three inductive elements, each of said elements connected at a common junction in a so called T connection and having a resonant frequency that will remain in a predetermined and narrow range despite wide variations in loading
   E. switch means, consisting of an SCR, an antiparallel diode, and enabling pulse generator, said switch coupled with said charging inductor means and said resonant circuit means for enabling a circulating current representing energy received by means of said charging inductor means, and
   F. means, coupled with said resonant circuit means for converting said circulating current to said direct current voltage consisting of an output transformer, rectifier, and filter.

6. A circuit as in claim 5 wherein said input voltage is a direct current voltage.

7. A circuit for providing a direct current voltage, said circuit comprising;
   A. circuit for rectifying input A C utility voltage to obtain a direct current voltage, and
   B. means for capacitive smoothing said direct current voltage, and
   C. charging inductance means for coupling said direct current voltage to a resonant circuit
   D. said resonant circuit including three inductive elements, two of said inductive elements coupled together at one end and at their other end to opposite ends of a third one of said inductive elements in a so called PI connection and having a resonant frequency that will remain in a predetermined and narrow range despite wide variations in loading
   E. switch means, consisting of an SCR, an antiparallel diode, and an enabling pulse generator, said switch coupled with said charging inductor means and said resonant circuit means for enabling a circulating current representing energy received by means of said charging inductor means, and
   F. means, coupled with said resonant circuit means for converting said circulating current to said direct current voltage consisting of an output transformer, rectifier, and filter.

8. A circuit as in claim 7 wherein said input voltage is a direct current voltage.

* * * * *